United States Patent
Ochiai

(10) Patent No.: US 8,957,636 B2
(45) Date of Patent: Feb. 17, 2015

(54) VEHICLE BATTERY-PACK EQUALIZATION SYSTEM AND VEHICLE BATTERY-PACK EQUALIZATION METHOD

(75) Inventor: Kiyoe Ochiai, Nagoya (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 224 days.

(21) Appl. No.: 13/575,238

(22) PCT Filed: Jun. 9, 2010

(86) PCT No.: PCT/JP2010/059759
§ 371 (c)(1),
(2), (4) Date: Jul. 25, 2012

(87) PCT Pub. No.: WO2011/155034
PCT Pub. Date: Dec. 15, 2011

(65) Prior Publication Data
US 2013/0069596 A1 Mar. 21, 2013

(51) Int. Cl.
*H02J 7/00* (2006.01)
*H01M 10/44* (2006.01)
*B60L 3/00* (2006.01)

(52) U.S. Cl.
CPC ........... *H01M 10/441* (2013.01); *B60L 3/0046* (2013.01); *H02J 7/0016* (2013.01); *H01M 2220/20* (2013.01); *Y02T 10/7055* (2013.01)
USPC ........................................................ 320/118

(58) Field of Classification Search
CPC .. H02J 7/0016; H02J 7/0018; Y02T 10/7055; Y02E 60/12; H01M 10/441
USPC ........................................................ 320/118
See application file for complete search history.

(56) References Cited

U.S. PATENT DOCUMENTS

| | | | |
|---|---|---|---|
| 6,573,687 B2* | 6/2003 | Kimura et al. | 320/132 |
| 2006/0082343 A1* | 4/2006 | Sobue et al. | 320/119 |
| 2006/0103351 A1* | 5/2006 | Tanigawa et al. | 320/118 |
| 2006/0214636 A1 | 9/2006 | Arai et al. | |
| 2008/0048617 A1* | 2/2008 | Yoshida | 320/132 |
| 2013/0106354 A1* | 5/2013 | Suzuki et al. | 320/116 |
| 2013/0229152 A1* | 9/2013 | Kurimoto | 320/126 |
| 2014/0028098 A1* | 1/2014 | Trigiani | 307/39 |

FOREIGN PATENT DOCUMENTS

| | | |
|---|---|---|
| JP | A-2006-246646 | 9/2006 |
| JP | A-2007-244058 | 9/2007 |

(Continued)

OTHER PUBLICATIONS

International Search Report issued in International Patent Application No. PCT/JP2010/059759 dated Jul. 20, 2010.

*Primary Examiner* — Jack Chiang
*Assistant Examiner* — Magid Dimyan
(74) *Attorney, Agent, or Firm* — Oliff PLC

(57) ABSTRACT

Provided is a vehicle battery-pack equalization system (100), wherein, in a battery pack (10) to be mounted on a vehicle, and which is comprised of a plurality of unit cells (11) connected in series, each of the unit cells (11) are made to be discharged to equalize the voltages thereof, or the remaining capacities (SOC) thereof. The equalization processing time of each of the unit cells (11) is set to a period of time the result of multiplying the discharging time of the battery pack (10) starting from just before the equalization processing, and the ratio of the difference between the currents discharged by each of the unit cells (11) with respect to the equalization discharging current. In such a way, power consumption during equalization processing can be inhibited.

4 Claims, 3 Drawing Sheets

(56) References Cited

FOREIGN PATENT DOCUMENTS

| JP | A-2007-325458 | 12/2007 |
| JP | A-2008-054416 | 3/2008 |
| JP | A-2009-011022 | 1/2009 |
| JP | A-2010-088194 | 4/2010 |

* cited by examiner

VEHICLE BATTERY-PACK EQUALIZATION SYSTEM AND VEHICLE BATTERY-PACK EQUALIZATION METHOD

TECHNICAL FIELD

The present invention relates to a system and method for equalizing a voltage of each of two or more cells connected in series in a battery pack.

BACKGROUND ART

Recently, electric vehicles driven by an electric motor and hybrid vehicles driven by both an engine and electric motor have come into use. Such electrically-driven vehicles often use, as a power supply, a battery pack in which two or more nickel hydride or lithium ion secondary cells serving as unit cells are connected in series. In such a battery pack, as charging and discharging are repeated, a voltage variation at both ends of unit cells may be caused depending on a charged state (remaining capacity, or state of charge (SOC)) of each unit cell. If charging and discharging are continued with the voltage variation left unremoved, it may become easier for some unit cells to reach the upper or lower limit of cell voltage, resulting in a reduced usable range of the battery pack and shorter travel distance of the electrically-driven vehicle.

Therefore, it is suggested that equalization of a voltage at both ends of unit cells be started when an ignition switch of a vehicle is turned OFF with a recognition that unit cells are in equilibrium and free from polarization (For example, see Patent Document 1). Patent Document 1 discloses that the equalization of unit cells is accomplished by repeating, for a predetermined period, moving charges to a capacitor from a unit cell having a voltage at both ends higher than any other unit cells, and then moving charges from the capacitor to a unit cell having a voltage at both ends lower than any other unit cells.

Further, electric power for operation is consumed in an equalization circuit which senses battery characteristics of unit cells to force an overcharged unit cell to consume, as required, electric power in order to equalize the unit cells. Therefore, it is suggested that, when a predetermined time elapses after the running of the vehicle with a battery pack is stopped, electric power to be supplied to an equalization circuit is stopped in order to reduce electric power consumption by such equalization circuit (for example, refer to Patent Document 2). Patent Document 2 discloses that equalization is performed slowly for a long period of time (about a few hours to one day) and stopped after a predetermined time elapses. Patent Document 2 further describes that the predetermined time to perform equalization is changed in accordance with an instruction from a user or ambient temperature of the vehicle.

When equalization of unit cells is performed with an ignition switch of a vehicle being turned OFF, some electric power from the electric source for the vehicle is consumed. Therefore, in order to reduce the electric power required for the equalization process, it is suggested that a temperature variation in a battery pack is sensed in order to avoid the equalization process of the unit cells when the sensed temperature variation is within a predetermined range (for example, Patent Document 3). Patent Document 3 further describes that a predetermined time interval to perform an equalization process is set in a timer such that the voltage state of a battery pack is monitored in order to determine whether or not discharge for equalization is necessary; and that an equalization process is performed when the discharge for equalization is determined necessary.

PRIOR ART DOCUMENTS

Patent Documents

Patent Document 1: JP 2006-246646A
Patent Document 2: JP 2008-054416A
Patent Document 3: JP 2007-325458A

DISCLOSURE OF THE INVENTION

Objects to be Achieved by the Invention

As described in Patent Documents 1 and 2, because equalization of unit cells is time consuming, a predetermined time period is often set such that equalization is performed only for the set time period. However, when equalization of unit cells is always performed for the predetermined time period, it is possible that equalization is performed more than necessary, resulting in large electric power consumption for equalization. In the conventional art described in Patent Document 1, because equalization of unit cells is performed with an ignition switch turned OFF, if the ignition switch is turned ON before the predetermined time elapses, the next charging or discharging operation is performed before the current equalization of unit cells has been completed. Therefore, there has been an occasion that a voltage variation of unit cells is accumulated due to uncompleted equalizations of unit cells. In the conventional art described in Patent Document 3, a voltage state of a battery pack is monitored at every time period set in a timer to perform an equalization process if necessary. There is a problem that because the time period set in the timer is an invariable time period, more electric power than necessary may be consumed if the set time period is long.

An object of the present invention is to reduce electric power consumption required for an equalization process in a vehicle battery-pack equalization system.

Means for Achieving the Objects

A vehicle battery-pack equalization system according to the present invention is characterized by a system that equalizes a voltage or a remaining capacity (SOC) of each of a plurality of cells connected in series in a battery pack mounted on a vehicle by discharging each of the plurality of cells, wherein equalization processing time of each of the cells is set to a time period which is obtained by multiplying a discharge time period of the battery pack immediately before an equalization process by a ratio of difference of an electric current discharged from each of the cells with respect to an equalization discharge electric current.

In a vehicle battery-pack equalization system according to the present invention, preferably, when the equalization process is interrupted during the equalization process, the equalization processing time of each of the cells for a next equalization process is set to a time period which is obtained by adding a discharge time period of the battery pack immediately before the next equalization process multiplied by a ratio of difference of an electric current discharged from each of the cells with respect to the equalization discharge electric current and a difference between an actual equalization processing time at a previous equalization process and a setting of the equalization processing time for the previous equalization process.

Further, in the vehicle battery-pack equalization system according to the present invention, preferably, the vehicle includes an ignition switch that starts and stops the vehicle, and in response to turning OFF of the ignition switch, setting of the equalization processing time is started, and the equalization process is started after the equalization processing time is set. Also, preferably, when the ignition switch is turned ON before the set equalization processing time elapses, the equalization process is interrupted.

A vehicle battery-pack equalization method according to the present invention is characterized by a method that equalizes a voltage or a remaining capacity (SOC) of each of a plurality of cells connected in series in a battery pack mounted on a vehicle by discharging each of the plurality of cells, wherein an equalization process is started after setting an equalization processing time of each of the cells to a time period which is obtained by multiplying a discharge time period of the battery pack immediately before the equalization process by a ratio of difference of an electric current discharged from each of the cells with respect to an equalization discharge electric current.

In a vehicle battery-pack equalization method according to the present invention, preferably, when the equalization process is interrupted during the equalization process, the equalization processing time of each of the cells for a next equalization process is set to a time period which is obtained by adding a discharge time period of the battery pack immediately before the next equalization process multiplied by a ratio of difference of an electric current discharged from each of the cells with respect to the equalization discharge electric current and a difference between an actual equalization processing time at a previous equalization process and a setting of the equalization processing time for the previous equalization process.

In a vehicle battery-pack equalization method according to the present invention, preferably, the vehicle includes an ignition switch that starts and stops the vehicle, and in response to turning OFF of the ignition switch, setting of the equalization processing time is started. Also, preferably, when the ignition switch is turned ON before the set equalization processing time elapses, the equalization process is interrupted.

Effects of the Invention

The present invention achieves an advantage that electric power consumption required for an equalization process can be reduced in a vehicle battery-pack equalization system.

BEST MODE FOR CARRYING OUT THE INVENTION

An embodiment according to the present invention is described below by reference to the drawings. Although, in the description below, the battery pack 10 to which the equalization process is applied is described as unit cells 11 of nickel hydride or lithium ion secondary cells connected in series as a high-voltage battery, unit cells of other types may be combined. In such a case, each of the unit cells 11 corresponds to each of the cells defined in claim 1. Further, the battery pack 10 may be formed by two or more battery blocks connected in series, each of which includes two or more unit cells connected in series. In such a case, each battery block corresponds to each of the cells defined in claim 1.

Figure 1:
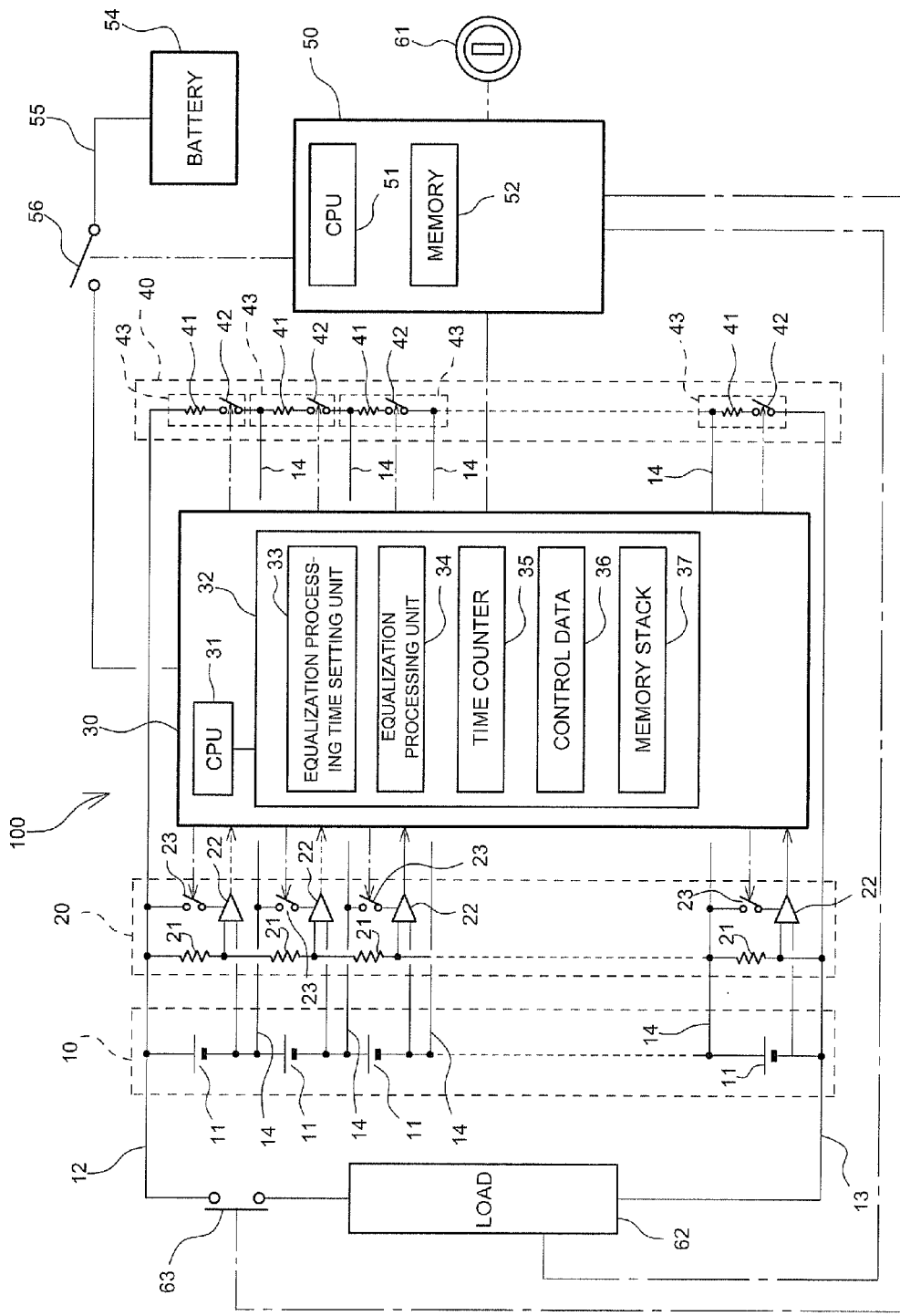
FIG. 1 is a schematic diagram which shows a configuration of a vehicle battery-pack equalization system according to an embodiment of the present invention.

As shown in FIG. 1, a vehicle battery-pack equalization system 100 according to an embodiment of the present invention includes voltage sensors 20 for measuring a voltage of each unit cell 11 of a battery pack 10 in which two or more unit cells 11 are connected in series; an equalization circuit 40 for equalizing a voltage of each unit cell 11; and an equalization controller 30 for outputting an instruction on the operation of the equalization circuit 40 in accordance with an input from the voltage sensors 20. It should be noted that, in FIG. 1, dash-dot lines represent signal lines.

The battery pack 10 is a high-voltage battery formed by connecting, in series, two or more unit cells 11 of nickel hydride or lithium ion secondary cell. Each end of the battery pack 10 is connected, via an inverter or the like, to a load 62 such as a vehicle driving motor. Further, a system relay 63 is provided between the load 62 and the battery pack 10 for disconnecting the connection between the load 62 and the battery pack 10.

Each of voltage sensors 20 for detecting a voltage of each unit cell 11 includes a voltage divider resistor 21 which is connected in parallel to each unit cell 11, and an op-amp 22 which is connected between a negative side of the respective voltage divider resistor 21 and a negative side of the respective unit cell 11. All the voltage divider resistors 21 have the same resistance and are arranged in series in relation to each other. The two ends of each voltage divider resistor 21 are respectively connected to a plus-side electrical path 12 and a minus-side electrical path 13 of the battery pack 10. An output of each op-amp 22 is connected to the equalization controller 30 via an interface (not shown) such that the signal is input to the equalization controller 30. A voltage at both ends of each voltage divider resistor 21 is an average voltage of the unit cells 11 which can be obtained by dividing the overall voltage of the battery pack 10 by the number of unit cells 11. Each op-amp 22 outputs a voltage difference between a voltage of the respective unit cell 11 and the average voltage of the unit cells 11. Further, each op-amp 22 is configured to be driven by electric power supplied, via a switch 23, from the respective unit cell 11 from which the op-amp 22 senses the voltage difference. Each switch 23 is connected to the equalization controller 30 and is configured to be turned ON and OFF in accordance with an instruction from the equalization controller 30.

In the equalization circuit 40, unit discharge circuits 43, each of which includes a discharge resistor 41 and an ON/OFF switch 42 connected in series with the discharge resistor 41, are connected in series in the same number as the unit cells. The ends of the equalization circuit 40 are respectively connected to the plus-side electrical path 12 and the minus-side electrical path 13 of the battery pack 10. The two ends of each unit discharge circuit 43 are connected to a plus-side end and a minus-side end of each unit cell 11 via a respective connection line 14. Each unit discharge circuit 43 is arranged to be in parallel with the corresponding unit cell 11. Further, each ON/OFF switch 42 of each unit discharge circuit 43 is connected to the equalization controller 30 via an interface (not shown) such that each ON/OFF switch is turned ON/OFF in accordance with an instruction from the equalization controller 30.

The equalization controller 30 is a computer which includes a CPU 31 for processing signals and a memory 32. The memory 32 includes an equalization processing time setting unit 33 for setting a time period for performing an equalization process which equalizes a voltage among unit cells 11; an Equalization processing unit 34 for performing the equalization process for the set time period; a time counter 35 for counting the time period in which the equalization process is performed; control data 36 which include data such as discharge characteristics of each unit cell 11; and a memory stack 37 for storing a remaining time period for the equalization process of each unit cell 11, described below.

An electrically-driven vehicle on which the vehicle battery-pack equalization system 100 according to the present embodiment is mounted includes a controller 50 for controlling ON and OFF of a power supply of the electrically-driven vehicle and electric power supplied to the load 62, and a power supply 54 for supplying electric power for driving the equalization controller 30. Provided with an electric power supply line 55 for supplying electric power from the power supply 54 to the equalization controller 30 is a power supply switch 56 which disconnects a connection between the power supply 54 and the equalization controller 30. Further, an ignition switch 61 is provided with the electrically-driven vehicle for starting and stopping the vehicle.

The controller 50 is a computer which includes a CPU 51 for processing signals and a memory 52 in which control programs and data are stored. The controller 50 is configured to be connected with the equalization controller 30 to exchange signals and data therebetween. The power supply switch 56, the system relay 63, and the load 62 are connected to the controller 50 via respective interfaces (not shown) and configured to be operated in accordance with an instruction from the controller 50. Further, the ignition switch 61 is connected to the controller 50 via an interface (not shown) such that a signal indicating whether a driver has turned ON or OFF the ignition switch 61 is input to the controller 50.

Operations in the embodiment having the above configuration are described below by referring to FIGS. 2 and 3. While the electrically-driven vehicle is running, the system relay 63 is ON and electric power is supplied from the battery pack 10 to the load 62. Further, with the power supply switch 56 and switch 23 turned ON, the equalization controller 30 monitors a voltage of each unit cell 11 by receiving the voltage from the voltage sensors 20. As shown in step S101 in FIG. 2, the controller 50 receives an ON/OFF signal from the ignition switch 61 and transmits the signal to the equalization controller 30. As shown in step S102 in FIG. 2, the equalization controller 30 determines whether or not the ignition switch 61 is OFF. When the ignition switch 61 is OFF, the equalization controller 30 recognizes that the system relay 63 is OFF, so the connection between the battery pack 10 and the load 62 is disconnected. Then, as shown in step S103 in FIG. 2, the equalization controller 30 starts calculating a time period required for the equalization process and setting the equalization process time.

Here, by referring to FIG. 3, the description below shows an example of voltage change of each unit cell 11 when the electrically-driven vehicle is running with both the ignition switch 61 and system relay 63 being ON. At the start of running of the electrically-driven vehicle, each unit cell 11 is fully charged up to the upper limit of the capacity, which is voltage $V_1$ for all the unit cells as shown at point p in FIG. 3. When the electrically-driven vehicle starts running in this state, each unit cell 11 discharges along the discharge characteristic curve, resulting in a decrease in voltage. Although the actual discharge curves of the respective unit cells 11 may be different, here the discharge curves are assumed to be identical for sake of explanation. Although curves a and b should be identical, they are illustrated as two lines here for sake of explanation. Discharge electric currents of respective unit cells 11 are different. Here, it is assumed that a discharge electric current of one unit cell 11a is $I_1$ (A), while a discharge electric current of another unit cell 11b is $I_2$ (A), which is larger than the $I_1$ (A). When electric power is discharged from the battery pack 10 to the load 62 or the like for the purpose of running the electrically-driven vehicle, electric power is discharged from each unit cell 11 for the amount of the discharged electric current multiplied by a time period. Because the discharge time period T (time period in which the ignition switch 61 is ON) is identical for unit cells 11a and 11b, the discharged current amounts $Ah_1$ and $Ah_2$ of the unit cells 11a and 11b can be obtained by the following equations:

$$Ah_1 = I_1 \times T \qquad \text{(Equation 1)}$$

$$Ah_2 = I_2 \times T \qquad \text{(Equation 2)}$$

Where the unit of the discharged current amount is ampere hour. The discharge electric current $I_2$ (A) of unit cell 11b is larger than the discharge electric current $I_1$ (A) of the other unit cell 11a for ΔI. Therefore, as shown in FIG. 3, the unit cell 11a discharges $Ah_1$ (ampere hour) from point p to point q shown in a solid line a for time T, while the unit cell 11b discharges $Ah_2$ (ampere hour) from point p to point r shown in a dash-dot line b. Therefore, the unit cell 11b discharges more than the unit cell 11a for the discharged current amount difference ΔAh.

$$\begin{aligned}\Delta Ah &= Ah_2 - Ah_1 \\ &= (I_2 - I_1) \times T \\ &= \Delta I_d \times T\end{aligned} \qquad \text{(Equation 3)}$$

Therefore, the remaining capacity (SOC) becomes lower for that amount, resulting in variation in remaining capacities (SOC) of the unit cells 111 and 11b. Accordingly, variations appear in the voltages of these unit cells, such as voltages $V_2$ and $V_3$.

There is another difference besides such a discharged electric current difference $\Delta I_d$ between unit cells 11a, 11b. Each unit cell 11 supplies a drive current to the respective op-amp 22 in order to enable monitoring of the voltage of the unit cell 11. Because there is a variation $\Delta I_e$ also in this driving current of each op-amp 22, the discharge electric current from each unit cell 11 varies for the amount of discharged electric current variation $\Delta I_d$ of each unit cell 11 which occurs when discharging from the battery pack 10 as a whole, added with the electric current variation $\Delta I_e$ consumed for monitoring the voltage of the respective unit cell 11. Due to this discharged electric current variation ($\Delta I = \Delta I_d + \Delta I_e$), a variation occurs in the remaining capacity (SOC) and voltage of each unit cell 11 when the battery pack 10 is discharged for a time period T.

When a difference exists in remaining capacity (SOC) or voltage among unit cells 11 as described above, the ON/OFF switch 42 of the unit discharge circuit 43 is turned ON, after a vehicle is stopped and the discharge from the battery pack 10 to the load 62 is stopped, for the unit cell 11 whose voltage is higher than the average voltage of the unit cells 11 so as to flow a minute equalization discharge electric current $I_3$ through a discharge resistor 41 to cause discharge from this unit cell with the higher voltage. In this way, voltage equalization is performed for each unit cell 11. When the unit cell 11a is discharged through the discharge resistor 41 as described above for the difference ΔAh between the discharged current amount $Ah_1$ of the unit cell 11a and the discharged current amount $Ah_2$ of the unit cell 11b, the total discharged current amount of the unit cell 11a becomes $Ah_2$, which is equal to the total discharged current amount of the unit cell 11b. Accordingly, the difference in the remaining capacity (SOC) and voltage can be eliminated. Thus, the time period Te required for the equalization process of unit cells 11a and 11b is obtained as follows:

$$Te = \Delta Ah/I_3 \qquad \text{(Equation 4)}$$
$$= \Delta I/I_3 \times T$$

Therefore, the time period Te required for the equalization process can be obtained by multiplying the discharge time period T from the battery pack 10 immediately before an equalization process by a ratio of difference ΔI of electric current discharged from the respective unit cell 11 with respect to an equalization discharge electric current $I_3$. Accordingly, the time period Te becomes proportional to the discharge time period T of the battery pack 10.

The equalization controller 30 starts a step of setting an equalization process time when the ignition switch 61 of an electrically-driven vehicle is turned OFF to stop the vehicle such that the battery pack 10 is disconnected from the load 62. First, as shown in step S103 in FIG. 2, the equalization controller 30 calculates a time period $A_n$ required for an equalization process for each unit cell 11. The ignition switch 61 is turned ON each time to start the electrically-driven vehicle, while the ignition switch 61 is turned OFF each time to stop the electrically-driven vehicle. Therefore, the OFF of the ignition switch 61 (IG OFF) for the current time is referred to as "n-th IG OFF" in FIG. 2. The equalization controller 30 calculates a time period $Am_n$ required for an equalization process for an m-th unit cell $11_m$ for the current time (n-th time) from the following equation.

$$Am_n = \Delta Im_n/I_3 \times T_n \qquad \text{(Equation 5)}$$

Where $T_n$ represents a time period (in hours) starting when the ignition switch 61 is turned ON for the n-th time until the ignition switch 61 is turned OFF for the n-th time; and $\Delta Im_n$ is a difference between an electric current discharged from the m-th unit cell $11_m$ during that period and a reference discharge current of the unit cells 11. For example, the difference may be an electric current difference between the electric current discharged from the m-th unit cell $11_m$ during that period and the average discharged electric current of the unit cells $11_m$. Alternatively, by setting the minimum discharged electric current of the unit cells 11 as a reference, the difference in a discharged electric current may be an electric current difference between the minimum discharged electric current of the unit cells 11 and the electric current discharged from the m-th unit cell $11_m$. The discharged electric current difference $\Delta Im_n$ of the m-th unit cell $11_m$ from the reference discharge electric current is a sum of an electric current difference $\Delta Im_{an}$ of the m-th unit cell $11_m$ from the reference discharge electric current when supplying electric power from the battery pack 10 to the load 62 and an electric current difference $\Delta Im_{bn}$ between the electric current consumed for monitoring a voltage of the respective unit cell 11 and the reference electric current; that, is, $\Delta Im_n = \Delta Im_{an} + \Delta Im_{bn}$. These values $\Delta Im_{an}$ and $\Delta Im_{bn}$ can be stored as a map for each unit cell 11 in the control data 36 of the equalization controller 30.

Further, the equalization controller 30 may obtain, from the voltage sensors 20, a voltage difference between a voltage of the m-th unit cell $11_m$ when the ignition switch 61 is turned OFF and the average voltage of the unit cells 11. Then, based on this voltage difference and the discharge electric current curve included in the control data 36, the equalization controller 30 may obtain a discharged current amount difference $\Delta Ah_m$ between the discharged current amount of the m-th unit cell $11_m$ and the average discharged current amount of unit cells 11. The equalization controller 30 may calculate a time period $\Delta Am_n$ required for an equalization process of the m-th unit cell $11_m$ based on the following equation.

$$Am_n = \Delta Ah_m/I_3 \qquad \text{(Equation 6)}$$

Next, as shown in step S104 in FIG. 2, the equalization controller 30 reads out, from the memory stack 37, the remaining time period $Sm_{n-1}$ of the equalization process of the m-th unit cell $11_m$ performed after the previous (n−1 time) OFF of the ignition switch 61 described below. Then, as shown in step S105 in FIG. 2, the equalization controller 30 adds the remaining time period $Sm_{n-1}$ to the time period $Am_n$ required for the current equalization process of the m-th unit cell $11_m$ obtained above to calculate a setting of the current (n-th time) equalization processing time $Am_n^*$ of the m-th unit cell $11_m$ by the following equation.

$$Am_n^* = Am_n + Sm_{n-1} \qquad \text{(Equation 7)}$$

The equalization controller 30 completes the setting step of the equalization processing time when calculating the setting of the equalization processing time $Am_n^*$ (where m is 1 to the number of unit cells) of each unit cell $11_m$ based on Equation 7.

Figure 2:
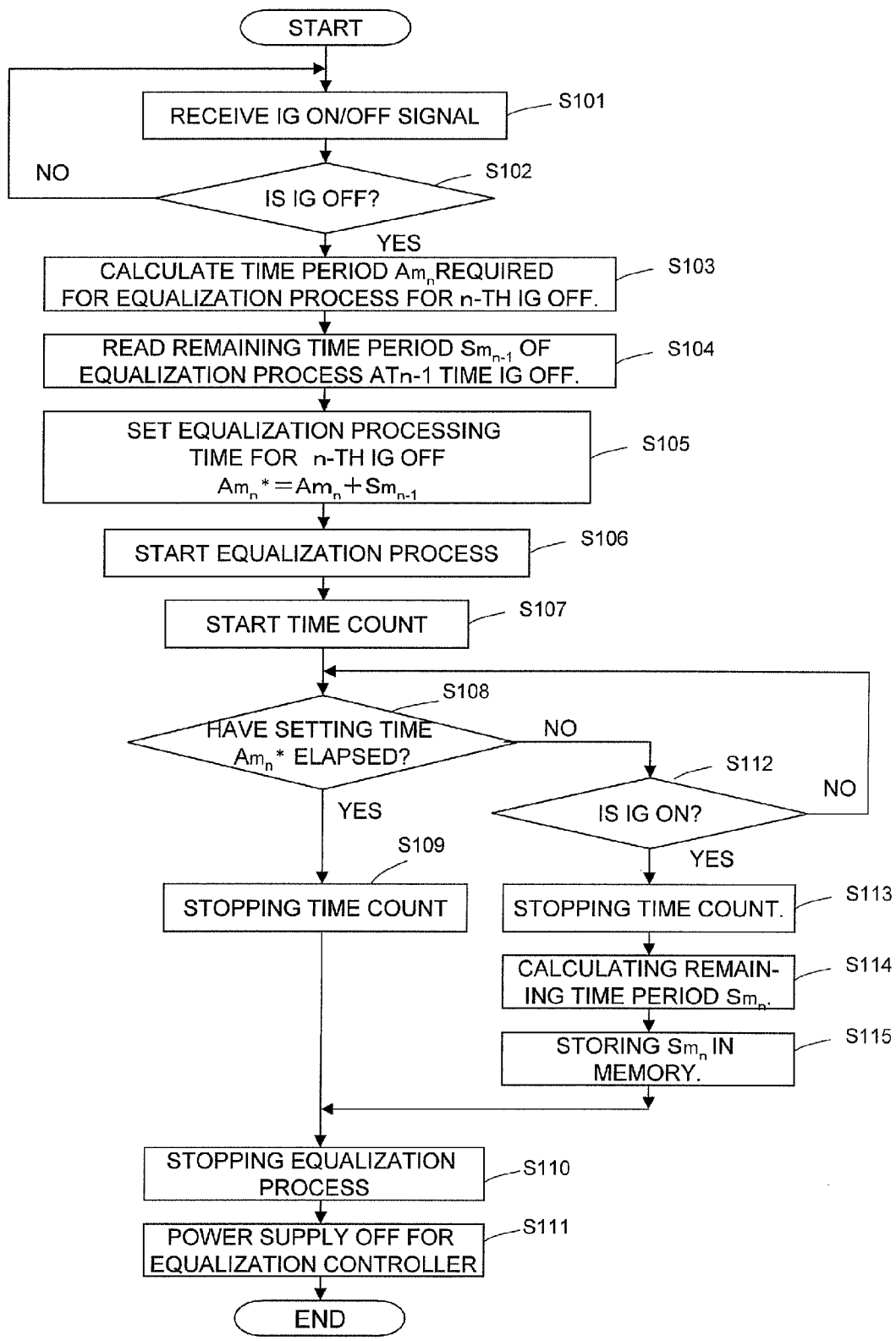
FIG. 2 is a flowchart which shows operations of a vehicle battery-pack equalization system according to the embodiment.
Figure 3:
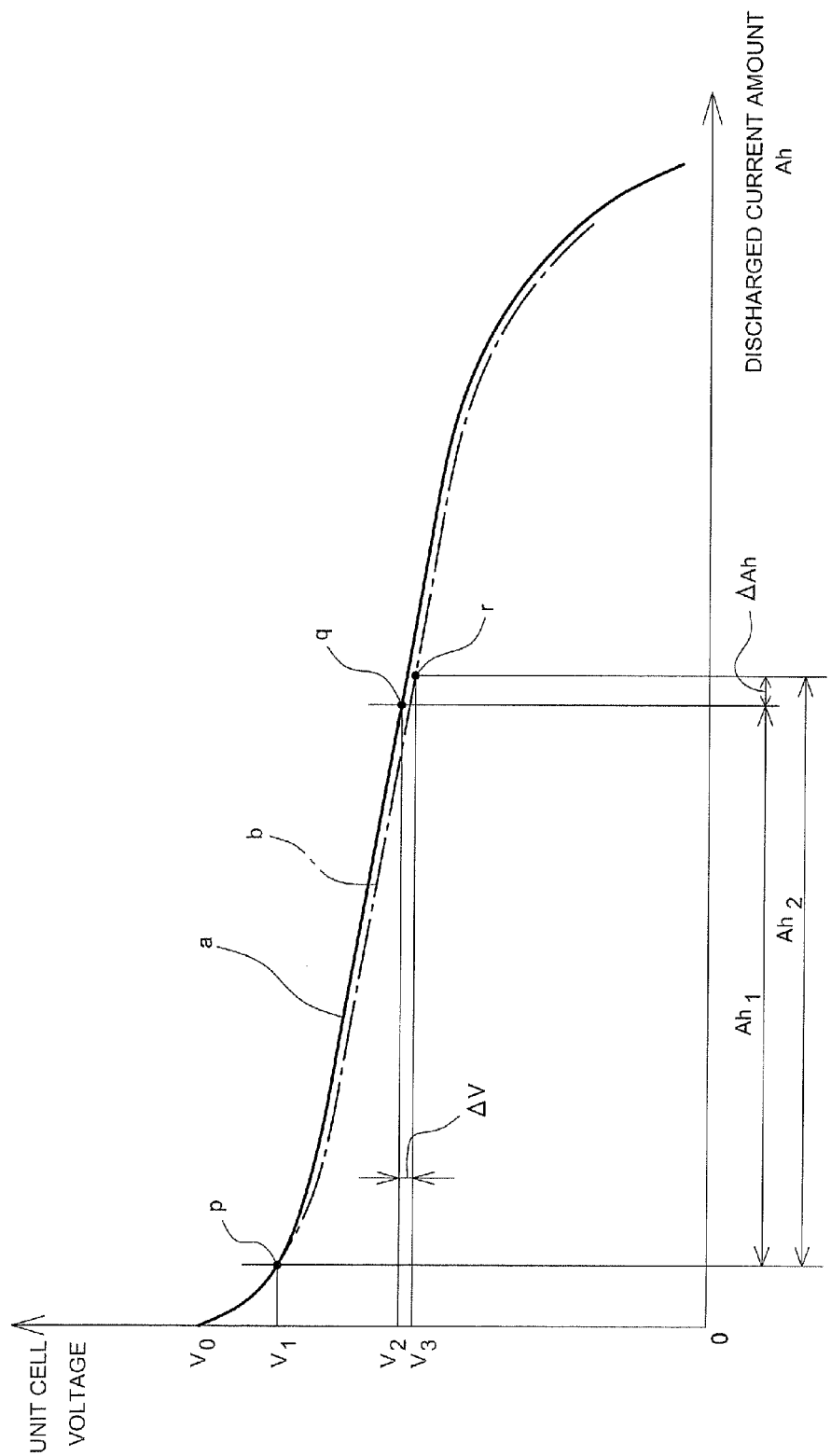
FIG. 3 is an explanatory graph which shows discharge characteristics of unit cells according to the embodiment.

After completing the setting of the equalization processing time, the equalization controller 30 starts the step of the equalization process as shown in step S106 in FIG. 2. The equalization process is performed, for example, on a unit cell 11 whose setting of the equalization processing time $A_n^*$ is positive, on all of unit cells 11 when the maximum negative value is set as a reference value for the equalization processing time setting $A_n^*$, or only on unit cells 11 whose setting of the equalization processing time $A_n^*$ is higher than a certain value set as a reference setting $A_s^*$ of the equalization processing time. The description below is provided for an equalization process applied to a unit cell whose setting of the equalization processing time $A_n^*$ is positive.

The equalization controller 30 turns ON the respective ON/Off switch 42 provided in parallel with each m-th unit cell $11_m$ whose setting of the equalization processing time $Am_n^*$ is positive, in order to discharge electric power stored in the unit cell $11_m$ through each discharge resistor 41 to thereby reduce the voltage of the unit cell $11_m$. Further, as shown in step S107 in FIG. 2, the equalization controller 30 starts counting time t (count time step) during which the ON/OFF switch 42 is ON and the equalization process is actually performed. When the count time t for the m-th unit cell $11_m$ exceeds the setting of the equalization processing time $Am_n^*$, the equalization controller 30 finishes the equalization process of the unit cell $11_m$ by turning OFF the ON/OFF switch 42 corresponding to the unit cell $11_m$. As shown in step S110 in FIG. 2, for all the target unit cells 11 whose setting of the equalization processing time $Am_n^*$ is positive, the equalization controller 30 finishes the equalization process when the count time t exceeds each setting of the equalization processing time $Am_n^*$. The equalization controller 30 turns each switch 23 OFF to stop electric power supply to the respective op-amp 22. Further, the equalization controller 30 outputs a signal, to the controller 50, indicating that the equalization process has been completed. As shown in step S111 in FIG. 2, in response to receipt of the equalization process complete signal from the equalization controller 30, the controller 50 outputs an instruction to turn the power supply switch 56 OFF. The power supply switch 56 is turned OFF in accordance with this instruction, whereby the electric power supply to the equalization controller 30 is stopped.

On the other hand, when a driver turns the ignition switch 61 ON during the equalization process, a signal is input, to the controller 50, indicating that the ignition switch 61 has been turned ON. Then, the controller 50 sends an ignition switch 61 ON signal to the equalization controller 30. In response to receipt of this signal indicating that the ignition switch 61 has been turned ON as shown in step S112, the equalization controller 30 stops the time count as shown in step 113 in FIG. 2, and stores, in the memory stack 37, the counted time to obtained at the stop; that is, the time period in which the equalization process has been actually performed. Then, as shown in step S114 in FIG. 2, the equalization controller 30 calculates, as a remaining time period $Sm_n$, a time difference between the counted time to obtained when the ignition switch 61 is turned ON and the setting of the equalization processing time $Am_n^*$ for the m-th unit cell $11_m$ in the equalization process whose setting of the equalization processing time $Am_n^*$ is positive based on Equation 8 shown below, and stores the obtained value in the memory stack 37 as shown in step 115 in FIG. 2.

$$Sm_n = Am_n^* - tc \quad \text{(Equation 8)}$$

It should be noted that, with the unit cells $11_m$ whose remaining time period $Sm_n$ is negative, the equalization processing time for the unit cell $11_m$ has elapsed and thus the equalization has been completed. On the other hand, with the unit cells $11_m$ whose remaining time period $Sm_n$ is positive, the equalization processing time for the unit cell $11_m$ has not elapsed and thus the equalization has not been completed. The equalization controller 30 stores the remaining time period $Sm_n$ of the unit cells $11_m$ if the remaining time period $Sm_n$ is positive in the m-th memory stack 37 for the unit cell $11_m$. This remaining time period $Sm_n$ is read out from the memory stack 37 in order to calculate a setting of the equalization processing time $Am_{n+1}^*$ when the ignition switch 61 is turned OFF next time (n+1 time), and then added to the time period $Am_{n-1}$ required for the equalization process as shown in the following equation.

$$Am_{n+1}^* = Am_{n+1} + Sm_n \quad \text{(Equation 9)}$$

Further, the remaining time period $Sm_{n-1}$, obtained in a similar manner, of the equalization process performed after the ignition switch 61 is turned OFF for the previous time (n−1 time) is added to the time $Am_n$ required for equalization process for the current time (n-th time) when setting the equalization processing time for the current time (n-th time) as shown in Equation 7 as described above. When the ignition switch 61 is turned ON and an equalization process of m-th unit cell $11_m$ is interrupted in this way during the process before the time $Am_n$ required for equalization process for the unit cell $11_m$ elapses, the remaining time period $Sm_n$ is carried over sequentially to the next and later setting of the equalization processing time, it is possible to avoid the voltage difference and variations of the remaining capacities (SOC) among unit cells 11 from being accumulated and becoming larger due to the equalization process performed only for a time period less than the full time period required for the equalization process.

After storing the remaining time period $Sm_n$ in the memory stack 37, the equalization controller 30 stops the equalization process as shown in step S110 in FIG. 2. Then, the equalization controller 30 turns each switch 23 OFF to stop electric power supply to each op-amp 22. Further, the equalization controller 30 outputs a signal, to the controller 50, indicating that the equalization process has been completed. Upon receipt of this equalization process complete signal from the equalization controller 30, the controller 50 outputs an instruction to turn the power supply switch 56 OFF as shown in step S111 in FIG. 2. The power supply switch 56 is turned OFF in accordance with this instruction and the electric power supply to the equalization controller 30 is stopped.

As described above, the vehicle battery-pack equalization system 100 according to the embodiment of the present invention performs an equalization process by setting an equalization processing time for each unit cell $11_m$ depending on variation of discharged electric current from the unit cell $11_m$. Therefore, because it is possible to avoid each unit cell $11_m$ from discharging more than necessary, the electric current consumed during the equalization process can be reduced. Further, in a vehicle battery-pack equalization system 100 according to the embodiment of the present invention, because the remaining time period $Sm_n$ is carried over to the next and later setting of the equalization processing time if an equalization process is interrupted during the process by the ignition switch 61 which is turned ON before the time period $Am_n$ required for the equalization process elapses, it is possible to avoid a voltage difference and a variety of remaining capacities (SOC) from being accumulated and becoming larger. Furthermore, because it is also possible to avoid the situation that some of the unit cells 11 easily reach the upper or lower limit of the cell voltage, the usage width of the battery pack 10 can be larger, thereby avoiding shortening of the running distance of electrically-driven vehicle.

In the embodiments described above, the voltage sensors 20 are described to sense a difference between the average voltage of the unit cells 11 and a voltage of each unit cell 11. However, the voltage sensors 20 may directly measure a voltage of each unit cell 11 to input the measured voltage to the equalization controller 30. Then, the equalization controller 30 may calculate a time period $A_n$ required for an equalization process of each unit cell 11 based on the voltage of each unit cell 11 to set each setting of the equalization processing time $A_n^*$.

REFERENCE NUMERALS 10 battery pack, 11 unit cell, $11_m$ m-th unit cell, 12 plus-side electrical path, 13 minus-side electrical path, 14 connection line, 20 voltage sensor, 21 voltage divider resistor, 22 op-amp, 23 switch, 30 equalization controller, 32 memory, 33 equalization processing time setting unit, 34 equalization processing unit, 35 time counter, 36 control data, 37 memory stack, 40 equalization circuit, 41 discharge resistor, 42 ON/OFF switch, 43 unit discharge circuit, 50 controller, 52 memory, 54 power supply, 55 power supply line, 56 power supply switch, 61 ignition switch, 62 load, 63 system relay, 100 vehicle battery-pack equalization system, $Am_n$ time period required for equalization process for m-th unit cell, $Am_n^*$ setting of equalization processing time for m-th unit cell, $A_n$ time required for equalization process, $A_n^*$ setting of equalization processing time, $A_s^*$ reference setting of equalization processing time, $Sm_n$ remaining time period of equalization process for m-th unit cell.

The invention claimed is:
1. A vehicle battery-pack equalization system that equalizes a voltage or a remaining capacity (SOC) of each of a plurality of cells connected in series in a battery pack mounted on a vehicle by discharging each of the plurality of cells, wherein equalization processing time of each of the cells is set to a time period which is obtained by multiplying a discharge time period of the battery pack immediately before an equalization process by a ratio of difference of an electric current discharged from the respective cell with respect to an equalization discharge electric current.

2. The vehicle battery-pack equalization system according to claim 1, wherein the vehicle includes an ignition switch that starts and stops the vehicle, and in response to turning OFF of the ignition switch, setting of the equalization processing time is started, and the equalization process is started after the equalization processing time is set.

3. A vehicle battery-pack equalization method that equalizes a voltage or a remaining capacity (SOC) of each of a plurality of cells connected in series in a battery pack mounted on a vehicle by discharging each of the plurality of cells, wherein an equalization process is started after setting an equalization processing time of each of the cells to a time period which is obtained by multiplying a discharge time period of the battery pack immediately before the equalization process by a ratio of difference of an electric current discharged from the respective cell with respect to an equalization discharge electric current.

4. The vehicle battery-pack equalization method according to claim 3, wherein the vehicle includes an ignition switch that starts and stops the vehicle, and in response to turning OFF of the ignition switch, setting of the equalization processing time is started.

* * * * *